(12) United States Patent
Walter et al.

(10) Patent No.: US 8,634,396 B2
(45) Date of Patent: *Jan. 21, 2014

(54) METHODS, DEVICES, SYSTEMS, AND COMPUTER PROGRAM PRODUCTS FOR REGISTRATION OF MULTI-MODE COMMUNICATIONS DEVICES

(75) Inventors: Edward Walter, Boerne, TX (US); Larry Pearson, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/598,209

(22) Filed: Aug. 29, 2012

(65) Prior Publication Data

US 2012/0320835 A1 Dec. 20, 2012

Related U.S. Application Data

(63) Continuation of application No. 12/330,184, filed on Dec. 8, 2008, now Pat. No. 8,259,694.

(51) Int. Cl.
*H04L 12/66* (2006.01)
*H04L 12/28* (2006.01)

(52) U.S. Cl.
USPC .......................................... 370/338; 370/352

(58) Field of Classification Search
USPC ......... 370/254, 352, 260, 338, 328, 251, 255; 455/433, 436.1, 426.1, 411
See application file for complete search history.

(56) References Cited

U.S. PATENT DOCUMENTS

| | | | | |
|---|---|---|---|---|
| 7,673,021 | B2* | 3/2010 | Tasker et al. | 709/220 |
| 7,676,229 | B2* | 3/2010 | Albina et al. | 455/445 |
| 7,701,883 | B2* | 4/2010 | Beckemeyer | 370/260 |
| 7,734,910 | B2* | 6/2010 | Nasu | 713/155 |
| 8,036,362 | B1* | 10/2011 | Skinner | 379/211.02 |
| 2004/0052214 | A1* | 3/2004 | Teh et al. | 370/238 |

OTHER PUBLICATIONS

Linksys CIT310 Dual-Mode Cordless Phone For Yahoo! Messenger; http://www.amazon.com/Linksys-CIT310-Dual-Mode-Cordless-Messenger/dp/B000JI5HCO, 8 pages.

* cited by examiner

*Primary Examiner* — Thai Nguyen
(74) *Attorney, Agent, or Firm* — Myers Bigel Sibley & Sajovec, PA

(57) ABSTRACT

A method of registering a multi mode communications device for service can include registering a multi-mode communications device by receiving and transmitting registration information over separate communications networks.

3 Claims, 4 Drawing Sheets

METHODS, DEVICES, SYSTEMS, AND COMPUTER PROGRAM PRODUCTS FOR REGISTRATION OF MULTI-MODE COMMUNICATIONS DEVICES

STATEMENT OF PRIORITY

This application is a continuation application of and claims priority to, U.S. application Ser. No. 12/330,184, filed Dec. 8, 2008, now U.S. Pat. No. 8,259,694 the content of which is hereby incorporated herein by reference.

BACKGROUND

The following relates to the field of communications in general.

It is known to deploy dual mode voice over internet protocol (VOIP) telephones. These VOIP telephones may be configured to use either, for example, an Internet connection or a telephone network to initiate and receive calls. For example, a conventional VOIP telephone may be configured so that the user can initiate a call using a local WiFi "hotspot" that is connected to the Internet, to take advantage of lower cost connectivity and thereby reduce expensive roaming charges. Alternatively, the VOIP telephone may be used to initiate/receive calls via the Public Switched Telephone Network, such as when the user is at home. Still further, the user may initiate/receive calls using a third network such as a GSM or CDMA type network if the VOIP telephone is so configured.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments can provide methods, devices, systems, and computer program products for registration of multi mode communications devices. In some embodiments, a method of registering a multi mode communications device for service can be provided by registering a multi mode communications device by receiving and transmitting registration information over separate communications networks.

In some embodiments, a multi mode telephone can be registered for service by utilizing separate communication networks, such as a PSTN and the Internet. For example, in some embodiments, during registration the multi mode telephone can receive registration information from a registration server over a first communications network (such as the Internet) and transmit registration information to the server over a second communications network (such as a PSTN, GSN, or CDMA network).

Still further, the utilizing different communications networks in the registration process can improve the security of the registration process thereby reducing the likelihood that unauthorized telephones can be registered or that unauthorized telephone can "spoof" the registration system. For example, in some embodiments, a somewhat unique identifier (such as MAC address of multi mode telephone) can be transmitted to the registration server, which in turn generates a number which is sufficiently random to provide adequate security for the registration process. Then, the registration server transmits the generated number back to the multi mode telephone along with a telephone number which the multi mode telephone calls as a second part of the registration process.

The multi mode telephone places the call to the number provided by the registration server using the PSTN, and transmits the number generated by the registration server during the first part of the registration process. The registration server can then use the number provided by the multi mode telephone during the call to authenticate the second part of the registration request, which may as stated above, further improve the authentication desired for the registration process as the registration process may be split across two networks, and more particularly, utilizes at least one network which is relatively more secure than the Internet.

DETAILED DESCRIPTION OF EMBODIMENTS

Figure 1:
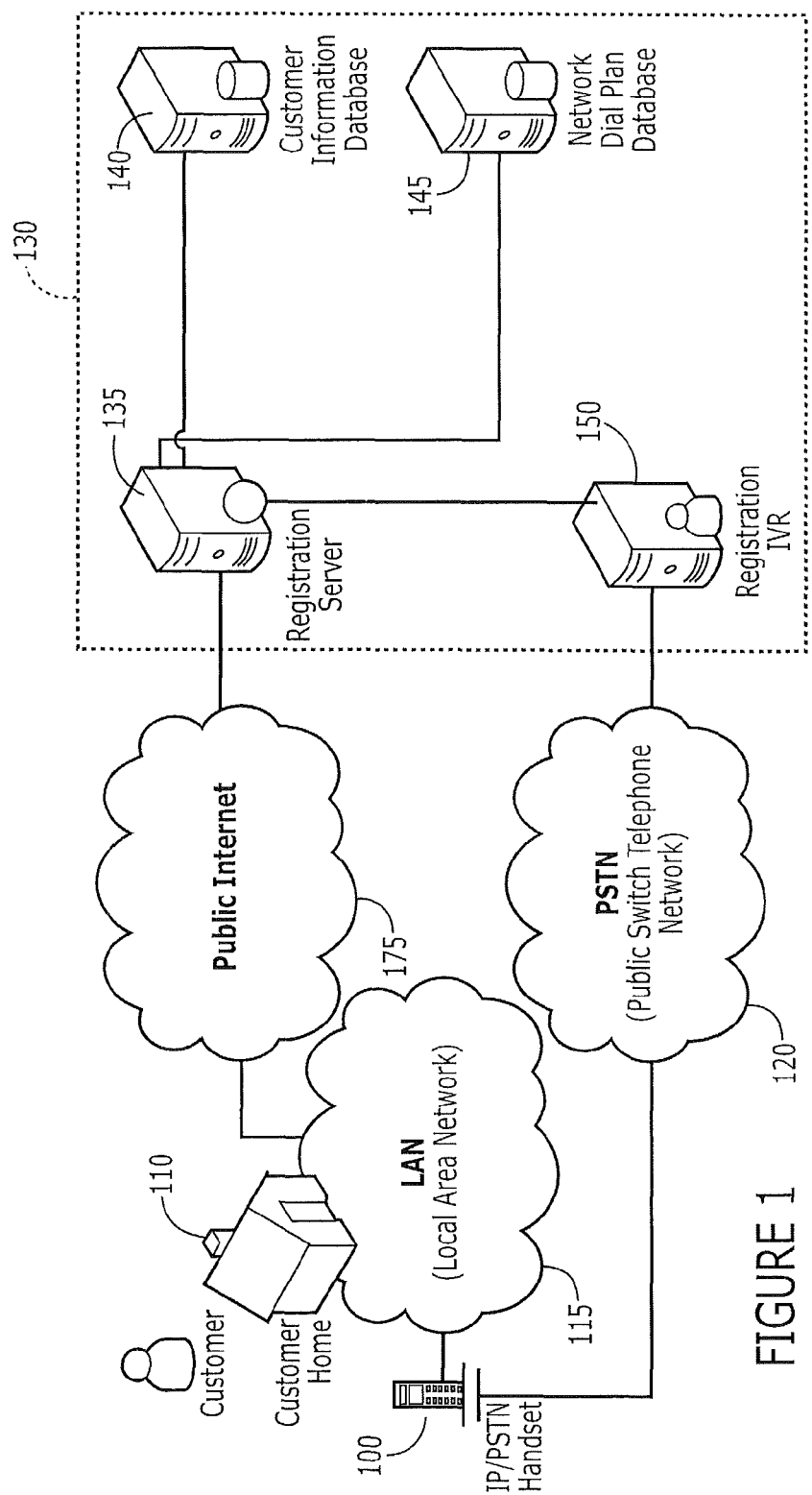
FIG. 1 is a schematic representation of a multi-mode communications device at a customer location having access to a public internet connection as well as a public switched telephone network, both of which can access a registration system in some embodiments.

Embodiments are described more fully hereinafter with reference to the accompanying drawings. The embodiments may, however, be in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting of the embodiment. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which this embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present embodiments may be methods, systems, and/or computer program products. Accordingly, embodiments may be entirely hardware, entirely software or an a combination of software and hardware aspects. Furthermore, embodiments may take the form of a computer program product on a computer-usable storage medium having computer-usable program code embodied in the medium. Any suitable computer readable medium may be utilized including hard disks, CD-ROMs, optical storage devices, or magnetic storage devices.

Specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Embodiments also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations in embodiments may be written in an object oriented programming language such as JAVA®, Smalltalk or C++, JavaScript, Visual Basic, TSQL, Peri, or in various other programming languages. Software embodiments do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present embodiments are not TCP/IP-specific or Internet-specific. Exemplary embodiments may be implemented using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments can operate in a logically separated (or physically separated) client side/server side-computing environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment can be referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

In some embodiments, a client can be a program, such as a web browser, that requests information, such as web pages, from a server under the control of a user. In other embodiments, a client can be in the form of embedded software which may operate substantially without any input from the user other than, for example, powering the device on. Examples of clients can include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers.

The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP). According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client. It will be further understood that the client/server can communicate in a more secure fashion using, for example, Hypertext Transfer Protocol over Secure Socket Layer (HTTPS), which is a Uniform Resource Indicator commonly used over the Internet to indicate a secure communication, such as those used in payment transactions and corporate information systems.

Although embodiments are described herein with reference to the use of requests and responses according to the HTTPS protocol, it will be understood that any type of secure request/response protocol can be used to provide sufficient protection to the data so as to reduce the likelihood of spoofing or other un-authorized registration.

As used herein, the term "secure request" (and "secure response") includes requests made by, for example, a client directed to a server where the data in the request is intended to be secure. For example, in some embodiments, a secure request can be an HTTPS request made by a multi mode communications device to a registration server. In other embodiments, the secure request can be provided by encrypting the data included in the request using, for example, Secure Socket Layer (SSL), a Secure Shell (SSH) or the like.

In other embodiments, a secure request can be provided by a signature used to encode a clear text (i.e., un-encoded data) message. In these embodiments, the secure request may be provided by, for example, a cryptographic hash function, such as what is commonly referred to as a Secure Hash Algorithm (SHA) or a Message-Digest algorithm 5 (MD-5), where data to be transmitted is subject to the cryptographic hash function for protection during transmission. It will be understood that the above descriptions related to a secure request can also apply to a secure response issued responsive to a secure request.

As described herein below in greater detail, a multi-mode communications device can be registered for service by utilizing separate communication networks, such as a PSTN and the Internet. For example, in some embodiments, during registration the multi-mode communications device can receive registration information from a registration server over a first communications network (such as the Internet) and transmit registration information to the server over a second communications network (such as a PSTN, GSN, or CDMA network).

Still further, utilizing different communications networks in the registration process can improve the security of the registration process thereby reducing the likelihood that unauthorized devices can be registered or that an unauthorized device can "spoof" the registration system. For example, in some embodiments, a somewhat unique identifier (such as MAC address of the multi-mode communications device) can be transmitted to the registration server, which in turn generates a number which is sufficiently random to provide adequate security for the registration process. Then, the registration server transmits the generated number back to the multi-mode communications device along with a number which the multi-mode communications device dials as a second part of the registration process.

The multi-mode communications device places the call to the number provided by the registration server using the a first network (e.g., PSTN), and transmits the number generated by the registration server during the first part of the registration process. The registration server can then use the number provided by the multi-mode communications device during the call to authenticate the second part of the registration request, which may as stated above, further improve the authentication desired for the registration process as the registration process may be split across two networks, and more particularly, utilizes at least one network which is relatively more secure than the Internet.

It will be understood that, although some embodiments are described herein with reference to a multi-mode telephone as the multi-mode communications device, the multi-mode communications device can be any two-way communications device that registers with a network for service and can operate using more than one mode of communications. For example, in other embodiments, the multi-mode communications device can function as a video phone, a VOIP telephone (capable of using services such as Skype or Truphone), a cellular wireless telephone, a text messaging terminal, or any other type of information appliance capable of using more than one mode of communication. It will be understood that, as used herein, the term "call" includes any data used for communications over a network routed to/from the device, such as a text message, video, and/or audio regardless of how the data is encoded.

FIG. 1 is a schematic representation of the deployment of a multi mode telephone 100 located at a customer location 110, which can utilize a local area network 115, to provide connectivity to the Internet 175. The multi mode telephone 100 is also coupled to a public switched telephone network (PSTN 120). A registration system 130 is coupled to both the Internet 175 and the PSTN 120 so that the multi mode telephone 100 can communicate with the registration system 130 using either network. Although not shown in FIG. 1, it will be understood that in some embodiments, the PSTN 120 can be replaced by any other type of communications network that can be used to provide voice communications between subscribers. For example, the PSTN 120 shown in FIG. 1 could be replaced with a wireless type communication network, such as a GSM type network or CDMA type network. As described above, in some embodiments, the multi mode telephone 100 can be a video phone that can communicate using a TCP/IP based network and/or a PSTN, a telephone capable of using VOIP (via the Internet) and/or POTS over the PSTN, and other types of communications devices.

The registration system 130 can include a plurality of separate systems used to implement different functions provided during the registration process. For example, as shown in FIG. 1, the registration system 130 can include a registration server 135 which can provide packet switched type communications with the multi mode telephone 100 via the Internet 175. The registration server 135 can also communicate with a customer information database 140, which can store configuration data that is provided to the multi mode telephone 100 during the data registration process, a network dial plan database 145, which can store dial plan information to be provided to the multi mode telephone 100 during registration, and still further, the registration system 130 can include a registration Interactive Voice Response (IVR) server 150 that is also coupled to the PSTN 120. Accordingly, in operation, the multi mode telephone 100 can place calls to the registration IVR server 150 via the PSTN 120 and can communicate with the registration server 135 during the registration process.

Figure 2:
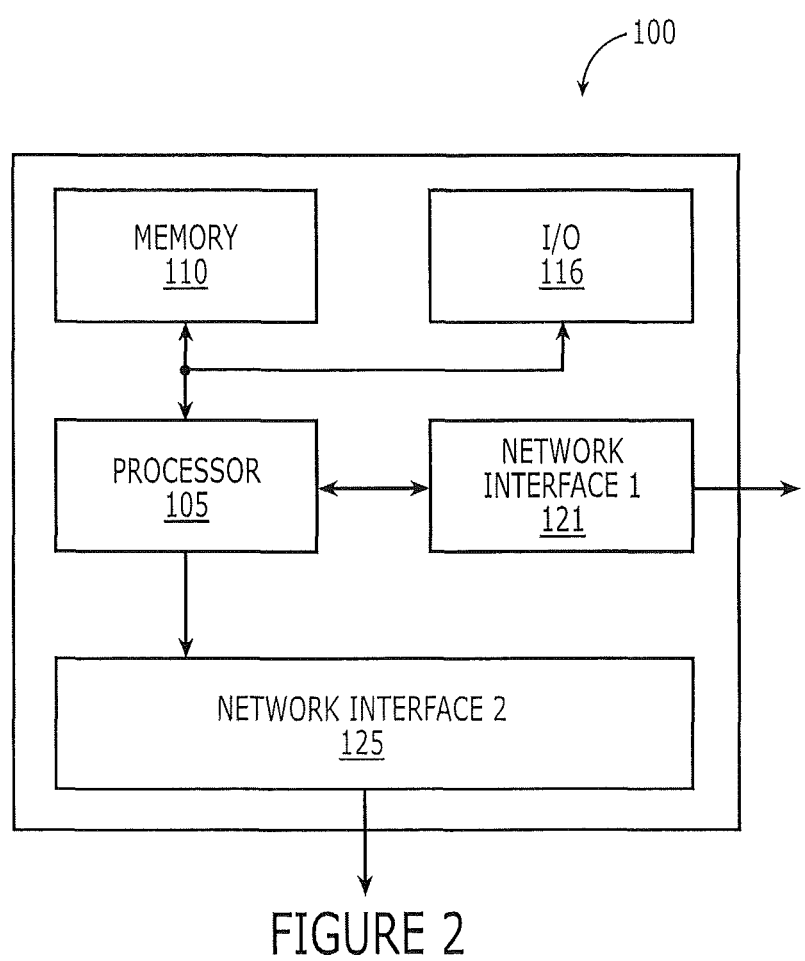
FIG. 2 is a block diagram that illustrates multi-mode communications devices according to some embodiments.

FIG. 2 is a block diagram that illustrates some components of a multi mode telephone 100 in some embodiments. In particular, the multi mode telephone 100 can include a processor 105 that is configured to coordinate overall operations of the multi mode telephone 100 by controlling the other components shown in FIG. 2. In particular, the processor 105 can coordinate the operations of a memory 110 that is configured to store information for the multi mode telephone 100, such as the information provided to/from the registration system during the registration process. Further, the processor 105 can maintain operations of IO circuits 116, such as those that provide a user interface for the telephone 100.

The memory 110 may include any memory devices containing the software and data used to implement the functionality in accordance with exemplary embodiments. The memory 110 can include, but is not limited to, the following types of devices: cache, ROM, PROM, EPROM, EEPROM, flash memory, SRAM, DRAM and magnetic disk. The memory 110 may include several categories of software to provide operation of the multi mode telephone, application programs, input/output device drivers, etc. The memory 110 can also include data that is used to coordinate the operations of the circuits shown therein as well as an operating system to govern the overall function of the device 100.

As also shown in FIG. 2, the multi mode telephone 100 can also include first and second network interfaces 121, 125. In particular, the first network interface 121 can operate under the control of the processor 105 to provide an interface for a first network, such as the Internet 175. As further shown in FIG. 2, the second network interface 125 can operate under the control of the processor 105 to provide an interface for a second network, such as the PSTN 120, or a GSM or CDMA type communication network. It will be understood that although the above described elements are the only ones shown in FIG. 2, a multi mode telephone 100 can include other components used provide operations related to the modes supported for the multiple modes of communications provided by the device. For example, a video phone would also include software and hardware used to video processing. It will be further understood that the processor 105 shown in FIG. 2, along with the other components therein, can provide the operations of the telephone 100 as illustrated, for example, in FIGS. 3 and 4 herein.

Figure 3:
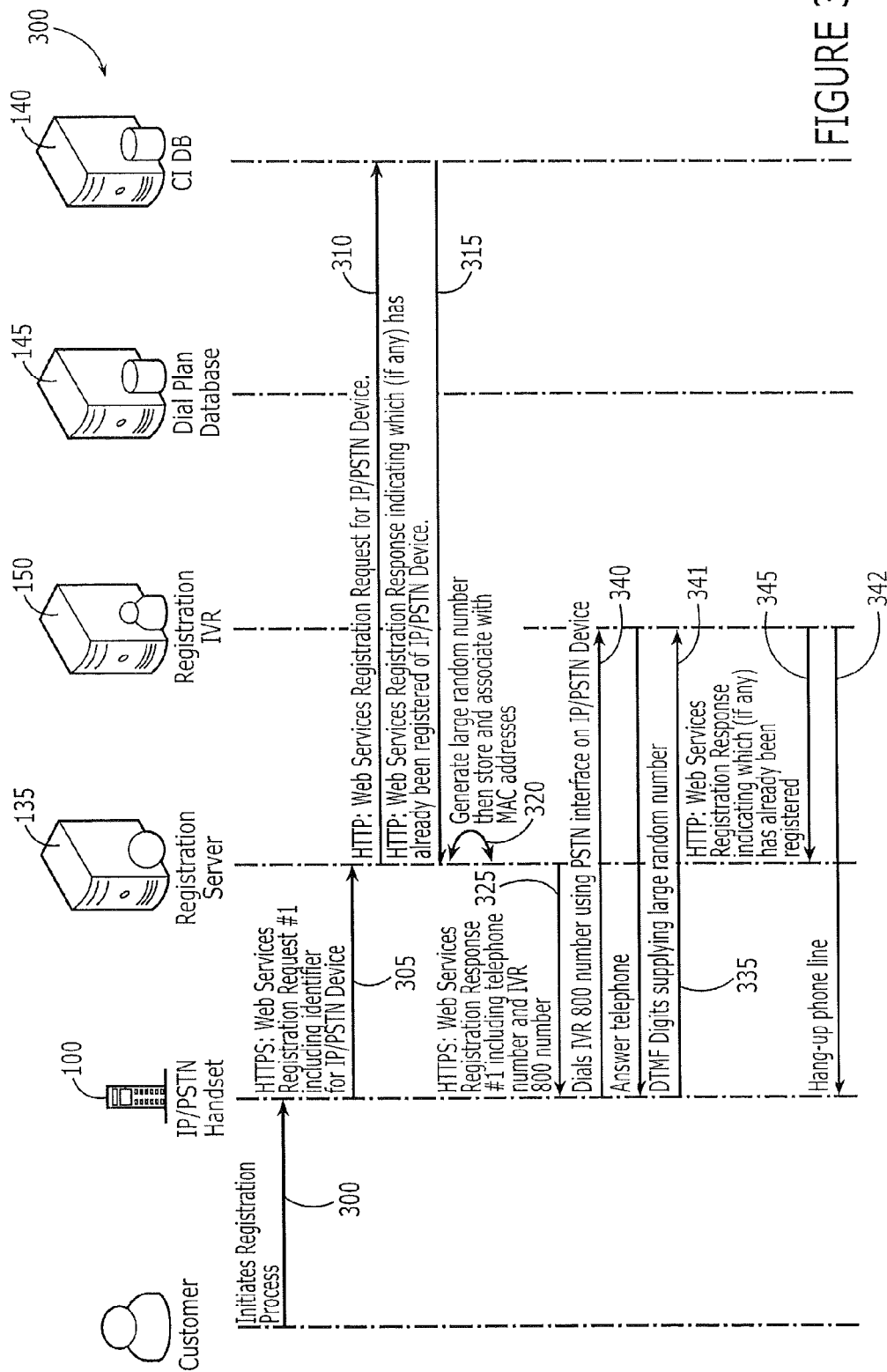
FIG. 3 is a flow diagram that illustrates operations of multi-mode communications devices and related servers during a registration process in some embodiments.

FIG. 3 is a schematic representation of a first part of a registration process conducted between the multi mode telephone 100 and the registration system 130 in some embodiments. In particular, in some exemplary embodiments, the registration process typically originates with some action 300 by the customer (or authorized user), such as powering on the telephone 100. In response, the telephone 100 initiates a Hyper Text Transfer Protocol Secure (HTTPS) request 305 for registration so that the telephone 100 can ultimately be used in a communications network associated with the service provider. In some embodiments, the HTTPS request provided with the telephone 100 includes a device identifier that identifies the telephone 100 with a sufficient degree of uniqueness within the Internet 175. For example, in some embodiments, the identifier is the Media Access Control (MAC) address for the telephone 100.

The registration server 135 receives the HTTPS request 305 from the telephone 100 and, in turn, issues a subsequent HTTP request 310 to the customer information database server 140, requesting confirmation of whether any other telephone has previously been registered with the same identifier provided by the telephone 100. For example, in some embodiments, the customer information database 140 would be provided with the MAC address for the telephone 100.

In response, the customer information database server 140 provides an HTTP response 315 to the registration server 135 indicating whether any telephone having the same identifier has been previously registered. Assuming that no previous telephone has been registered using the same identifier provided by the telephone 100, the registration server 135 generates a number based on the identifier provided by the telephone 100. It will be understood that the number generated by the registration server 135 may serve as a way to improve authentication for communication between the registration server 135 and the telephone 100. For example, the registration server 135 can generate a random number based on the MAC address provided by the telephone 100 or, alternatively, can generate a pseudo random number based on the MAC address provided by the telephone 100. The registration server 135 then associates the generated number with the identifier provided by the telephone 100. It will be understood that the number generated by the registration server 135 is sufficiently large to provide adequate security for the authentication process.

The registration server 135 then generates an HTTPS response 325 (corresponding to the HTTPS request 305) to the telephone 100. The HTTPS response 325 includes the number generated by the registration server 135, as well as a telephone number that can be used to initiate a call on the public switch telephone network 120 (or any communications system other than the Internet 175). For example, in some embodiments, the telephone number provided by the registration server 135 is an 800 number that corresponds to an IVR system that can be used to implement a second portion of the registration process conducted via the PSTN.

After the telephone 100 receives the generated number and telephone number from the registration server 135, the telephone 100 initiates a telephone call 340 over the PSTN 120 using the telephone number provided by the registration server 135. Once the call 341 to the registration IVR server 150 is established via the PSTN 120, the telephone 100 transmits the number using signals 335. In some embodiments, the signals are provided using Dual Tone Multi-Frequency signaling. The registration IVR server 150, then forwards a response to the registration server 135 indicating whether any other telephone has been registered using the same number generated by the registration server 135 during the first portion of the registration process. The call 341 to the registration IVR server 150 is then terminated 342.

As described above, although embodiments are described as using the HTTPS protocol, it will be understood that any type of secure request/response protocol can be used to provide sufficient protection to the data so as to reduce the likelihood of spoofing or other un-authorized registration.

Figure 4:
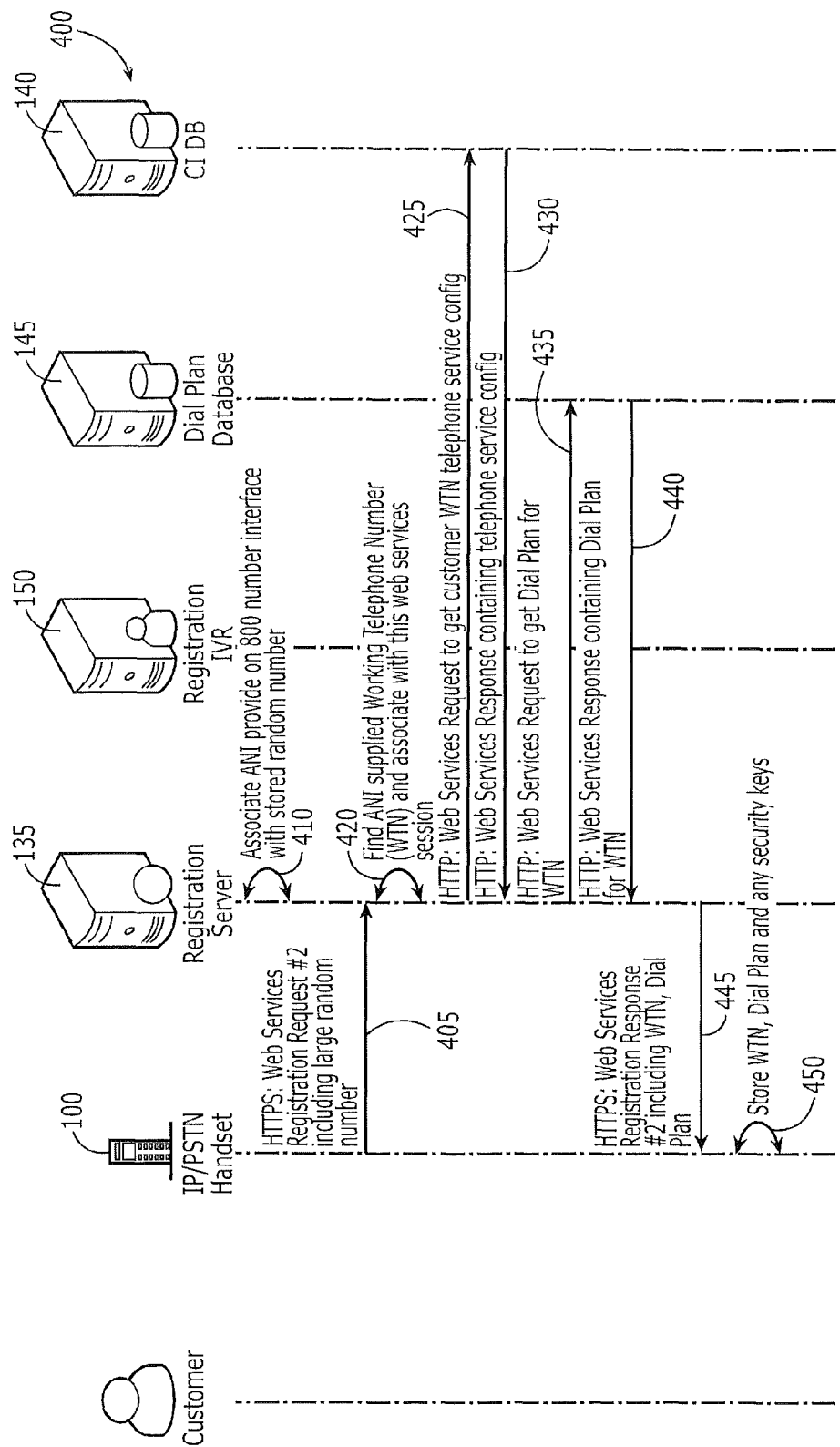
FIG. 4 is a flow diagram that illustrates operations of multi-mode communications devices and related servers during a registration process in some embodiments.

According to FIG. 4, the registration process of the telephone 100 continues with the telephone 100 initiating a registration request 405 via the Internet 175 to the registration server 135. The request 405 from the telephone 100 includes the number generated by the registration server 135 during the first portion of registration process. The registration server 135 then associates 410 the telephone number of the telephone 100 (determined during the call 340 placed to the registration IVR server 150) with the number generated by the registration server 135 during the first portion of the registration process. Also, the telephone number determined during the call to the registration IVR server 150 is associated 420 with a subsequent request for configuration and dialing plan information for the telephone 100.

The registration server 135 then forwards an HTTP request 425 to the customer information data base server 140 for an authenticated telephone number for the telephone 100 and associated telephone configuration information. In response, the customer information database server 140 issues an HTTP response 430 to the registration server 135 including the telephone service configuration. Further, the registration server 135 issues an HTTP request 435 to the dial plan database server 145 for a dial plan associated with the telephone 100. In turn, the dial plan database server 145 issues an HTTP response 440 to the registration server 135 including the dial plan for the telephone 100.

The registration server 135 then forwards the authenticated telephone number and configuration information and the dial plan to the telephone 100 via an HTTPS response 445 associated with the HTTPS request 405. In turn, the telephone 100 stores 450 the authenticated telephone number for the telephone 100 as well as the dial plan and configuration information in the memory 110. Furthermore, in some embodiments, additional security keys can be provided to the telephone 100 to facilitate secure operation of the telephone 100 with applications accessed via the Internet 175.

As described herein, a multi mode telephone can be registered for service by utilizing separate communication networks, such as a PSTN and the Internet. For example, in some embodiments, during registration the multi mode telephone can receive registration information from a registration server over a first communications network (such as the Internet) and transmit registration information to the server over a second communications network (such as a PSTN, GSN, or CDMA network).

Further, the utilizing different communications networks in the registration process can improve the security of the registration process thereby reducing the likelihood that unauthorized telephones can be registered or that unauthorized telephone can "spoof" the registration system. For example, in some embodiments, a somewhat unique identifier (such as MAC address of multi mode telephone) can be transmitted to the registration server, which in turn generates a number which is sufficiently random to provide adequate security for the registration process. Then, the registration server transmits the generated number back to the multi mode telephone along with a telephone number which the multi mode telephone calls as a second part of the registration process.

Still further, the registration process may allow the multi mode communications device to be registered with a single number valid for all of the multi modes of communications supported by the device. For example, the single number provided to the device during the registration process (such as the authenticated telephone number) can be used to place a call to the device regardless of which mode is used to route the call. In this way, if for example, a call were to be placed to a device configured to communicate via VOIP and/or a wireless communications network, the single authenticated telephone number can be used for either mode.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above and what is conceptually equivalent.

What is claimed:

1. A method of registering a multi mode communications device for service, comprising:
   registering a multi-mode communications device by receiving and transmitting registration information over separate communications networks;
   wherein registering comprises:
   receiving registration information for the multi mode communications device, at the multi mode communications device over a first communications network; and
   transmitting the registration information for the multi mode communications device from the multi mode communications device over a second communications network responsive to receiving the registration information;
   wherein the method further comprises:
   receiving a secure request for registration from the multi mode communications device over a packet-switched network including a multi mode communications device identifier;
   providing an at least pseudo-random identifier responsive to the multi mode communications device identifier;
   associating the at least pseudo-random identifier with multi mode communications device identifier;
   transmitting a secure response to the multi mode communications device, responsive to the secure request, including the registration information comprising the at least pseudo-random identifier and including a telephone number;
   receiving a telephone call from the multi mode communications device, over the second communications network, the telephone call directed to a registration interactive voice response server associated with the telephone number;
   receiving the registration information comprising the at least pseudo-random identifier and receiving a multi mode communications device number associated with the multi mode communications device at the registration interactive voice response server; and
   associating the multi mode communications device number with the at least pseudo-random identifier with the multi mode communications device identifier;
   wherein the secure request comprises a first secure request and the secure response comprises a first secure response, the method further comprising:
   receiving a second secure request for registration from the multi mode communications device over the packet-switched network including the registration information comprising the at least pseudo-random identifier;
   determining the multi mode communications device number associated with the at least pseudo-random identifier received via the second secure request to provide an authenticated multi mode communications device number;
   transmitting a secure request for a working telephone number service configuration of the authenticated multi mode communications device number to a customer information database;
   receiving a secure response to the secure request for the working telephone number service configuration including the multi mode communications device service configuration from the customer information database;

transmitting a secure request for a dial plan for the authenticated multi mode communications device number to a dial plan database;

receiving a secure response to the secure request for the dial plan for the authenticated multi mode communications device number from the dial plan database including the dial plan for the multi mode communications device;

transmitting a second secure response, responsive to the second secure request for registration, to the multi mode communications device including the authenticated multi mode communications device number, the multi mode communications device service configuration, and the dial plan for the multi mode communications device;

receiving the authenticated multi mode communications device number, the multi mode communications device service configuration, and the dial plan for the multi mode communications device at the multi mode communications device; and storing the authenticated multi mode communications device number, the multi mode communications device service configuration, and the dial plan for the multi mode communications device in the multi mode communications device;

wherein the method is computer implemented.

2. A method according to claim 1, wherein the first communications network comprises a packet-switched network using a request response protocol and the second communications network comprises one of a public switched telephone network communications network, a global system for telecommunications communications network, and a code division multiple access communications network.

3. A system for registering a multi mode communications device for service, comprising:
a processor;
a memory coupled to the processor and comprising computer readable program code that when executed causes the processor to perform operations comprising:
registering a multi-mode communications device by receiving and transmitting registration information over separate communications networks;
wherein registering comprises:
receiving registration information for the multi mode communications device, at the multi mode communications device over a first communications network; and
transmitting the registration information for the multi mode communications device from the multi mode communications device over a second communications network responsive to receiving the registration information;
wherein the operations further comprises:
receiving a secure request for registration from the multi mode communications device over a packet-switched network including a multi mode communications device identifier;
providing an at least pseudo-random identifier responsive to the multi mode communications device identifier;
associating the at least pseudo-random identifier with multi mode communications device identifier;
transmitting a secure response to the multi mode communications device, responsive to the secure request, including the registration information comprising the at least pseudo-random identifier and including a telephone number;

receiving a telephone call from the multi mode communications device, over the second communications network, the telephone call directed to a registration interactive voice response server associated with the telephone number;

receiving the registration information comprising the at least pseudo-random identifier and receiving a multi mode communications device number associated with the multi mode communications device at the registration interactive voice response server; and associating the multi mode communications device number with the at least pseudo-random identifier with the multi mode communications device identifier;

wherein the secure request comprises a first secure request and the secure response comprises a first secure response, the operations further comprising:

receiving a second secure request for registration from the multi mode communications device over the packet-switched network including the registration information comprising the at least pseudo-random identifier;

determining the multi mode communications device number associated with the at least pseudo-random identifier received via the second secure request to provide an authenticated multi mode communications device number;

transmitting a secure request for a working telephone number service configuration of the authenticated multi mode communications device number to a customer information database;

receiving a secure response to the secure request for the working telephone number service configuration including the multi mode communications device service configuration from the customer information database;

transmitting a secure request for a dial plan for the authenticated multi mode communications device number to a dial plan database;

receiving a secure response to the secure request for the dial plan for the authenticated multi mode communications device number from the dial plan database including the dial plan for the multi mode communications device;

transmitting a second secure response, responsive to the second secure request for registration, to the multi mode communications device including the authenticated multi mode communications device number, the multi mode communications device service configuration, and the dial plan for the multi mode communications device;

receiving the authenticated multi mode communications device number, the multi mode communications device service configuration, and the dial plan for the multi mode communications device at the multi mode communications device; and storing the authenticated multi mode communications device number, the multi mode communications device service configuration, and the dial plan for the multi mode communications device in the multi mode communications device.

* * * * *

UNITED STATES PATENT AND TRADEMARK OFFICE
CERTIFICATE OF CORRECTION

PATENT NO.        : 8,634,396 B2                                Page 1 of 1
APPLICATION NO.   : 13/598209
DATED             : January 21, 2014
INVENTOR(S)       : Walter et al.

It is certified that error appears in the above-identified patent and that said Letters Patent is hereby corrected as shown below:

In the Claims:
Column 11, Claim 3, Line 53: Please correct "the operations further comprises:"
                                    to read -- the operations further comprise: --

Signed and Sealed this
Twenty-ninth Day of July, 2014

Michelle K. Lee
*Deputy Director of the United States Patent and Trademark Office*